United States Patent [19]

Di Rocco

[11] 3,716,800

[45] Feb. 13, 1973

[54] SAMPLE AND HOLD CIRCUIT

[75] Inventor: James V. Di Rocco, Winchester, Mass.

[73] Assignee: Gordon Engineering Company, Wakefield, Mass.

[22] Filed: Jan. 6, 1971

[21] Appl. No.: 104,216

[52] U.S. Cl. ..................328/151, 307/251, 307/229, 328/127

[51] Int. Cl. ..............................................H03k 5/00

[58] Field of Search ...328/151, 127; 330/9; 307/229, 307/251

[56] References Cited

UNITED STATES PATENTS

| | | | |
|---|---|---|---|
| 3,390,347 | 6/1968 | Jones et al. | 328/151 |
| 3,518,563 | 6/1970 | Ainsworth | 328/151 |
| 3,263,177 | 7/1966 | Durrett | 328/151 |
| 3,011,129 | 11/1961 | Magleby et al. | 328/151 |
| 3,237,116 | 2/1966 | Skinner et al. | 330/9 |
| 3,139,590 | 6/1964 | Brown | 330/9 |
| 3,070,786 | 12/1962 | McIntyre | 330/9 |
| 3,582,675 | 6/1971 | Jordan | 330/9 |

OTHER PUBLICATIONS

"New Product Applications," IEEE Spectrum, October 1969, pp. 80, 81.

*Primary Examiner*—Archie R. Borchelt
*Assistant Examiner*—Harold A. Dixon
*Attorney*—Morse, Altman & Oates

[57] ABSTRACT

In a sample and hold circuit employing one operational amplifier connected in a high impedance voltage follower configuration, a first switch is connected to the input of the amplifier and second and third switches are connected serially between the output and input terminals of the amplifier. A capacitor is connected between the junction point of the second and third switch and ground. During the sample period, the first and third switches are energized to the ON state and the capacitor is charged to the voltage appearing at the output of the amplifier, the second switch being in the OFF state. During the hold period, the second switch is energized to the ON state and the charge on the capacitor is applied to the input of the amplifier, the first and third switches being in the OFF state.

4 Claims, 3 Drawing Figures

INVENTOR.
JAMES V. DiROCCO
BY
Morse, Altman & Oates
ATTORNEYS

SAMPLE AND HOLD CIRCUIT

BACKGROUND OF THE INVENTION

1. Field of Invention

The invention relates to electronic circuits and more particularly to a high input impedance sample and hold circuit employing one operational amplifier.

2. Description of the Prior Art

Generally, sample and hold circuits comprise a field effect transistor switch serially connected between an input source and an input terminal of an operational amplifier, and a capacitor connected between ground and the junction point of the operational amplifier input terminal and the field effect transistor switch. Such circuits have suffered from a number of deficiencies. One source of trouble lies in the fact that an offset or error voltage will often appear at the output of the operational amplifier during the hold period as a result of the gate to source capacitance of the switch. Another deficiency in prior art sample and hold circuits is that a buffer amplifier is serially interposed between the input source and the switch in order to provide a high impedance to the input source. The addition of the buffer amplifier makes such circuits costly.

SUMMARY OF THE INVENTION

An object of the present invention is to provide a high input impedance sample and hold circuit utilizing one operational amplifier connected in a voltage follower configuration. The circuit is characterized by a first switch serially connected between an input source and an input terminal of the operational amplifier, second and third switches connected serially between the input and output terminals of the operational amplifier, a capacitor connected between ground and the junction point of the second and third switches, and means for controlling the states of the first, second and third switches. During the sample period, the first and third switches are in the ON state, the second switch is in the OFF state, and the capacitor is charged by the signal at the output terminal of the operational amplifier. During the hold period, the second switch is in the ON state, the first and third switches are in the OFF state, and the charge on the capacitor is applied to the input terminal of the operational amplifier via the second switch.

The invention accordingly comprises the device possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 1:
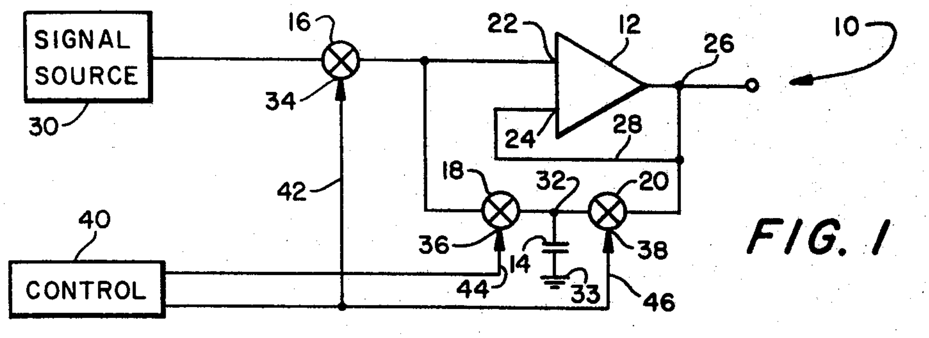
FIG. 1 is a schematic diagram in block form of a sample and hold circuit embodying the invention.

Referring now to FIG. 1, a sample and hold circuit embodying the invention is shown at 10. Generally, sample and hold circuit 10 comprises an amplifier 12, a storage device 14, and switching devices 16, 18, and 20. Amplifier 12, for example an operational amplifier having a non-inverting input terminal 22 an inverting input terminal 24, and an output terminal 26, is connected in a voltage follower configuration. That is, inverting terminal 24 is connected to output terminal 26 by means of a line 28. A signal source 30 supplies an output signal to non-inverting input terminal 22 via switch 16. One side of switch 18 is connected to non-inverting input terminal 22 and one side of switch 20 is connected to output terminal 26. The other sides of switches 18 and 20 are connected to a common junction point 32. Storage device 14, for example a capacitor, is connected between junction point 32 and a ground 33. Switches 16, 18, and 20 are provided with control terminals 34, 36, and 38, respectively. A switch control 40 supplies output signals to terminals 34, 36, and 38 via lines 42, 44, 46 respectively for governing the switching state of the correlative switch.

During the sample period, switches 16, 20 are in the ON state or closed and switch 18 is in the OFF state or opened. The output signal from source 30 is coupled to non-inverting input terminal 22 via closed switch 16 and the signal as at output terminal 26 is applied to capacitor 14 via closed switch 20. In consequence, capacitor 14 is driven by the low impedance as at the output of operational amplifier 12 and is charged by the signal appearing at output terminal 26. During the hold period, switch 18 is in the ON state and switches 16, 20 are in the OFF state. In consequence, the charge on capacitor 14 is applied to non-inverting input terminal 22. It will be appreciated that sample and hold circuit 10 is characterized by a high input impedance and a low droop rate, i.e. low leakage of capacitor 14.

Figure 2:
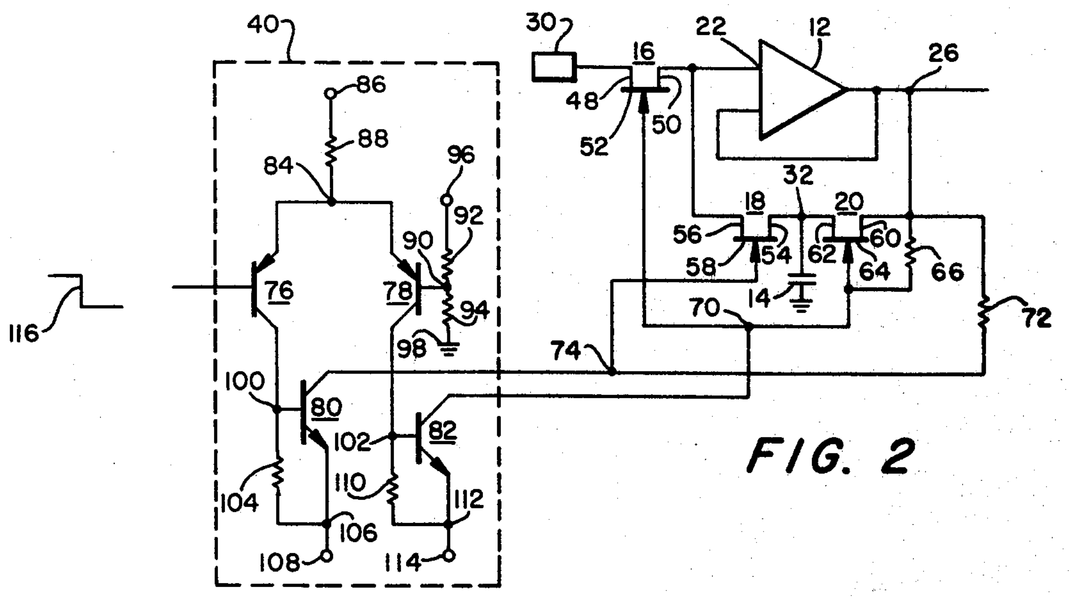
FIG. 2 is a detailed schematic diagram of the sample and hold circuit illustrated in FIG. 1.

For a fuller understanding of the invention, reference is now made to the detailed schematic diagram illustrated in FIG. 2 where corresponding parts of FIG. 1 are designated by like reference characters. By way of example, switch 16 is an N-channel field effect transistor (FET) having a source 48, a drain 50, and a gate 52. Switches 18 and 20 are similar to switch 16, switch 18 having a source 54, a drain 56, and a gate 58 and switch 20 having a source 60, a drain 62 and a gate 64. A resistive element 66 is connected between output terminal 26 and gate 64. Gates 52 and 64 are connected to a junction point 70. A resistive element 72 is connected between output terminal 26 and a junction point 74 which is further connected to gate 58. The output signals from control 40 are applied to junction points 70 and 74.

While in the above description of the contents of this circuit the switches have been described as FETs, it is to be understood that other semiconductor switches may be used to practice the invention along with other types of electronic switches and therefore it is within the scope of the invention to us terminology for these FETs such as valve means, gate means, switch means, and semiconductor switching elements.

By way of example, control 40 is a differential drive circuit which includes transistors 76, 78, 80, and 82. The emitters of transistors 76 and 78, for example PNP transistors, are connected together at a junction point 84 which is further connected to a terminal 86 by way of a resistive element 88. The base of transistor 78 is connected to a junction point 90 which serves as the junction point of one side of a resistive element 92 and one side of a resistive element 94. The other sides of resistive elements 92 and 94 are connected to a terminal 96 and a ground 98, respectively. The collectors of each transistor 76 and 78 are connected to junction points 100 and 102, respectively. Junction points 100 and 102 are connected also to the bases of transistors 80 and 82, respectively, for example NPN transistors.

A resistive element 104 is connected between junction point 100 and junction point 106 which is further connected to the emitter of transistor 80 and a terminal 108. A resistive element 110 is connected between junction point 102 and a junction point 112 which is further connected to the emitter of transistor 82 and a terminal 114. The collectors of transistors 80 and 82 are connected to junction points 74 and 70 respectively. By way of example, +15 volts is applied to terminal 86, 96 and −15 volts is applied to terminal 108, 114.

OPERATION

Before describing the operation of the circuitry illustrated in FIG. 1, it will be well to state some of the fundamentals of FETs when used as switches. A FET is in an OFF state or opened condition when a negative voltage is applied to the gate with respect to the source and drain. In other words, the drain and the source have a high impedance connection therebetween. When the negative voltage is removed from the gate, the impedance is decreased between the source and the drain until it becomes minimum and the FET is in an ON state or closed condition.

In the operation of FIG. 2, during the sample period, transistors 76 and 80 are in a conducting state and transistors 78 and 82 are in a non-conducting state. In consequence, FETs 16 and 20 are in the ON state and FET 18 is in the OFF state. A signal from source 30 is supplied to input terminal 22 of operational amplifier 12 via closed FET 16. The signal appearing at output terminal 26 is applied to capacitor 14 via closed FET 20 whereby capacitor 14 is charged.

During the hold period, a positive level 116 is applied to the base of transistor 76, whereby transistors 76 and 80 are de-energized to the OFF state and transistors, 78 and 82 are energized to the conducting state. In consequence, a negative voltage appears at gates 52, 64 and a positive potential appears at gate 58. In other words, FETs 16 and 20 are turned OFF and FET 18 is turned ON. The charged stored on capacitor 14 is presented at input terminal 22 of operational amplifier 12 through closed FET 18.

For best results, it is preferred that FETs 18 and 20 are a matched pair whereby the transients applied to their gates during the switching operation from sample to hold cancel each other and the charge on capacitor remains fixed.

Figure 3:
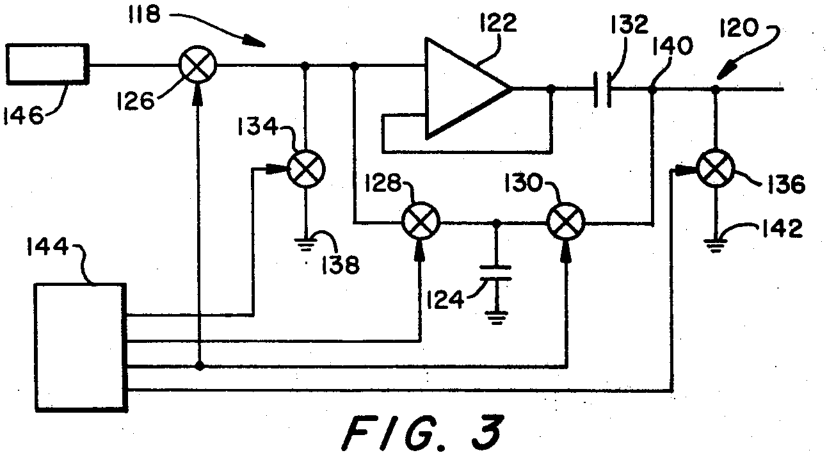
FIG. 3 is a schematic diagram in block form illustrating a second embodiment of the invention.

Referring now to FIG. 3, there is shown a second embodiment of the invention which comprises a sample and hold circuit 118 and a compensating network 120. Sample and hold circuit 118 includes operational amplifier 122, capacitor 124, and switching devices 126, 128, and 130 which are the counterparts of operational amplifier 12, capacitor 14, and switching devices 17, 18, and 20, respectively. Compensating network 120 includes a capacitor 132 and switching devices 134 and 136. Switch 134 is connected between the non-inverting input terminal of operational amplifier 122 and a ground point 138. Capacitor 132 is connected between the output terminal of operational amplifier 122 and a junction point 140 which is the counterpart of junction point 126. Junction point 140 is further connected to a ground point 142 through switching device 136. The ON-OFF states of switching devices 126, 128, 130, 134, and 136 are governed by signals generated by a control 144.

Network 120 is provided to compensate for the offset voltage of operational amplifier 122 which is an inherent characteristic of operational amplifiers and represents an error in the signal at the output terminal thereof. In the operation of the circuit shown in FIG. 3, prior to the sampling period, switches 134 and 136 are energized to the ON state and switches 126, 128, and 130 are de-energized to the OFF state by signals supplied from control 144. In consequence, the voltage as at the output of operational amplifier 122 which is the offset voltage of operational amplifier 122 is stored on capacitor 132.

During the sample period, switches 126 and 130 are energized to the ON state, and switches 134 and 136 are de-energized to the OFF state by the signals generated by control 144, switch 128 remaining in the OFF state. A signal supplied from a source 146 is applied to the non-inverting input terminal of operational amplifier 122 via closed switch 126. Capacitor 124 is charged by the signal appearing at junction point 140 which is free of the offset voltage of operational amplifier 122, the offset voltage of amplifier 122 being stored on capacitor 132. A detailed description of the operation of the compensating network is contained in a pending application of Paul G. Lucas, Ser. No. 15,690, filed Mar. 2, 1970, entitled a Sampling Amplifier, and assigned to the assignee of this application.

During the hold period, switch 128 is energized to the ON state and switches 126 and 130 are de-energized to the OFF state by the signals generated by control 144, switches 134 and 136 remaining in the OFF state. The charge stored on capacitor 124 is presented at the non-inverting input of operational amplifier 122 via closed switch 128. It will be noted that the operation of the sample and hold circuits illustrated in FIGS. 1 and 3 are similar, the difference between the embodiment in FIG. 1 and 3 being that the signal appearing at the output of the circuit in FIG. 3 is free of the operational amplifier offset voltage.

Since certain changes may be made in the foregoing, disclosure without departing from the scope of the invention herein involved, it is intended that all matter contained in the above description and depicted in the accompanying drawings be construed in an illustrative and not in a limiting sense.

What is claimed is:

1. A sample and hold circuit comprising:

a. amplifier means having input and output terminals;

b. first switch means electrically connected to the input terminal of said amplifier means;

c. second switch means electrically connected to the output terminal of said amplifier means;

d. third switch means electrically connected to the input terminal of said amplifier means and said second switch means; and e. first capacitor means connected between a ground and the junction of said second and third switch means;

f. during the sample period, said first and second switch means are in an ON state and said third switch means is in an OFF state, said first capacitor means being charged by the signal appearing at the output terminal of said amplifier means;

g. during the hold period, said third switch means is in the ON state and said first and second switch means are in the OFF state, the charge on said first capacitor means appearing at the input terminal of said amplifier means;

h. said second and third switch means being a matched pair of field effect transistor means which operate to cancel transients applied to their respective gates during the switching operation from the sample period to the hold period;

i. fourth switch means connected serially between the input terminal of said amplifier means and a ground;

j. second capacitor means interposed between the output terminal of said amplifier means and said second switch means; and k. fifth switch means connected serially between ground and the junction point of said second capacitor means and second switch means.

2. The sample and hold circuit as claimed in claim 1 including means for selectively controlling the switching states of said first, second, third, fourth and fifth switch means.

3. The sample and hold circuit as claimed in claim 1 wherein said first switch means is field effect transistor means.

4. A sample hold circuit comprising:

a. input terminal means adapted for reception of an input signal;

b. amplifier means having inverting and non-inverting input terminals and an output terminal, said inverting terminal connected to said output terminal, said amplifier means connected in a voltage follower configuration;

c. first switch means serially connected between said input terminal means and non-inverting terminal, said first switch means having ON and OFF states, said first switch means operating to apply said input signal at said input terminal to said non-inverting terminal when in the ON state, said first switch means operating to electrically isolate said input terminal means and non-inverting terminal when in the OFF state;

d. first field effect transistor means including first source, first drain and first gate means, said first field effect transistor means having ON and OFF switching states;

e. second field effect transistor means including second source, second drain and second gate means, said second field effect transistor means having ON and OFF switching states;

f. said first drain connected at a first junction of said first switch means and non-inverting terminal said first source and second drain connected at a second junction, said second source connected to said output terminal;

g. capacitor means serially connected between said second junction and a ground; and h. means for generating first and second signals for controlling the switching states of said first switch means and said first and second field effect transistor means said first signal applied to first switch means and said second gate, said second signal applied to said first gate;

i. said first switch means and said second field effect transistor means in the ON switching state and said first field effect transistor in the OFF switching state during the sample period;

j. said first switch means and said second field effect transistor means in the OFF switching state and said first field effect transistor in the ON switching state during the hold period;

k. during the sample period, said input signal is applied to said non-inverting terminal through said first switch means and said capacitor is charged to a signal as at said output terminal through said second field effect transistor means;

l. during the hold period, said charged signal across said capacitor is applied to said non-inverting terminal through said first field effect transistor means;

m. said first and second field effect transistor means being a matched pair which operate to cancel transients applied to their respective gates during the switching operation from the sample period to the hold period whereby the charge across said capacitor remains constant.

n. said means for controlling being a differential drive circuit including:

i. first transistor means having first base first emitter and first collector terminals;

ii. second transistor means having second base, second emitter and second collector terminals;

iii. third transistor means having third base, third emitter and third collector terminals; and iv. fourth transistor means having fourth base, fourth emitter and fourth collector terminals;

said first base adapted for receoption of a signal for controlling said first and second signals; said first and second emitters connected at a third junction adapted for reception of a first voltage, said first collector and third base connected at a fourth junction which is resistively connected to said third emitter, said third emitter adapted for reception of a second voltage, said second base adapted for reception of a third voltage, said second collector resistively connected to a fifth junction which is adapted for reception of a fourth voltage, said fourth emitter connected to said fifth junction, said fourth base connected to said fifth junction, said fourth base connected to said second collector, said fourth collector connected to said first switch means and said second gate for controlling the switching states of said first switch means and second field effect transistor means, said third collector connected to said first gate for controlling the switching state of said first effect transistor means.

* * * * *